(12) United States Patent
Wei

(10) Patent No.: US 12,454,212 B2
(45) Date of Patent: Oct. 28, 2025

(54) CONTROL ASSEMBLY FOR VEHICLE POSITION LAMP

(71) Applicant: JUTE INDUSTRIAL CO., LTD., Taichung (TW)

(72) Inventor: Shih-Chieh Wei, Taichung (TW)

(73) Assignee: JUTE INDUSTRIAL CO., LTD., Taichung (TW)

( * ) Notice: Subject to any disclaimer, the term of this patent is extended or adjusted under 35 U.S.C. 154(b) by 30 days.

(21) Appl. No.: 18/085,784

(22) Filed: Dec. 21, 2022

(65) Prior Publication Data

US 2024/0208400 A1    Jun. 27, 2024

(51) Int. Cl.
- *B60Q 1/26* (2006.01)
- *B60Q 1/44* (2006.01)
- *H05B 47/10* (2020.01)
- *H05B 47/11* (2020.01)
- *H05K 9/00* (2006.01)

(52) U.S. Cl.
CPC ............. *B60Q 1/2603* (2013.01); *B60Q 1/44* (2013.01); *H05B 47/11* (2020.01); *B60Q 2300/314* (2013.01); *H05K 9/0007* (2013.01)

(58) Field of Classification Search
CPC .. B60Q 1/2603; B60Q 1/44; B60Q 2300/314; H05B 47/10; H05B 47/11; H05B 45/10; H05B 45/30; H05K 9/0007
See application file for complete search history.

(56) References Cited

U.S. PATENT DOCUMENTS

| | | | | |
|---|---|---|---|---|
| 6,424,256 B1* | 7/2002 | Ryder | ............. | B60Q 1/445 |
| | | | | 340/478 |
| 7,307,518 B2* | 12/2007 | Bogos | ............. | B60Q 1/441 |
| | | | | 340/467 |
| 2023/0029461 A1* | 2/2023 | Ebrahemi | ........... | B62J 6/057 |

FOREIGN PATENT DOCUMENTS

| | | | |
|---|---|---|---|
| CN | 103342108 A | * | 10/2013 |
| CN | 206155281 U | * | 5/2017 |
| CN | 213502679 U | * | 6/2021 |
| CN | 114737501 A | * | 7/2022 |
| KR | 100334747 B1 | * | 7/2003 |

* cited by examiner

*Primary Examiner* — Jimmy T Vu
(74) *Attorney, Agent, or Firm* — MUNCY, GEISSLER, OLDS & LOWE, P.C.

(57) ABSTRACT

A control assembly for a vehicle position lamp is provided, including: a lighting device and a sensing unit. The lighting device includes at least one lighting member and a control module connected with the at least one lighting member. The sensing unit is connected with the control module and is configured to sense an external environment and generate a sensing signal. The control module receives the sensing signal and adjusts a brightness of the at least one lighting member accordingly.

6 Claims, 3 Drawing Sheets

CONTROL ASSEMBLY FOR VEHICLE POSITION LAMP

BACKGROUND OF THE INVENTION

Field of the Invention

The present invention relates to a control assembly for a vehicle position lamp.

Description of the Prior Art

Generally, a vehicle position lamp is disposed on a front and a rear of a vehicle, which allows other drivers to know the width and a distance of the vehicle so as to improve driving safety.

However, the conventional vehicle position lamp has an unchangeable brightness and can only be turned on when the vehicle is started. When the external environment is dim (such as cloudy or rainy days, dense fog or air pollution), the brightness of the conventional vehicle position lamp is insufficient, which causes poor warning effect and safety concern.

The present invention is, therefore, arisen to obviate or at least mitigate the above-mentioned disadvantages.

SUMMARY OF THE INVENTION

The main object of the present invention is to provide a control assembly for a vehicle position lamp, which can change the brightness according to the external environment.

To achieve the above and other objects, the present invention provides a control assembly for a vehicle position lamp, including a lighting device and a sensing unit. The lighting device includes at least one lighting member and a control module connected with the at least one lighting member. The sensing unit is connected with the control module and is configured to sense an external environment and generate a sensing signal. The control module receives the sensing signal and adjusts a brightness of the at least one lighting member accordingly.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
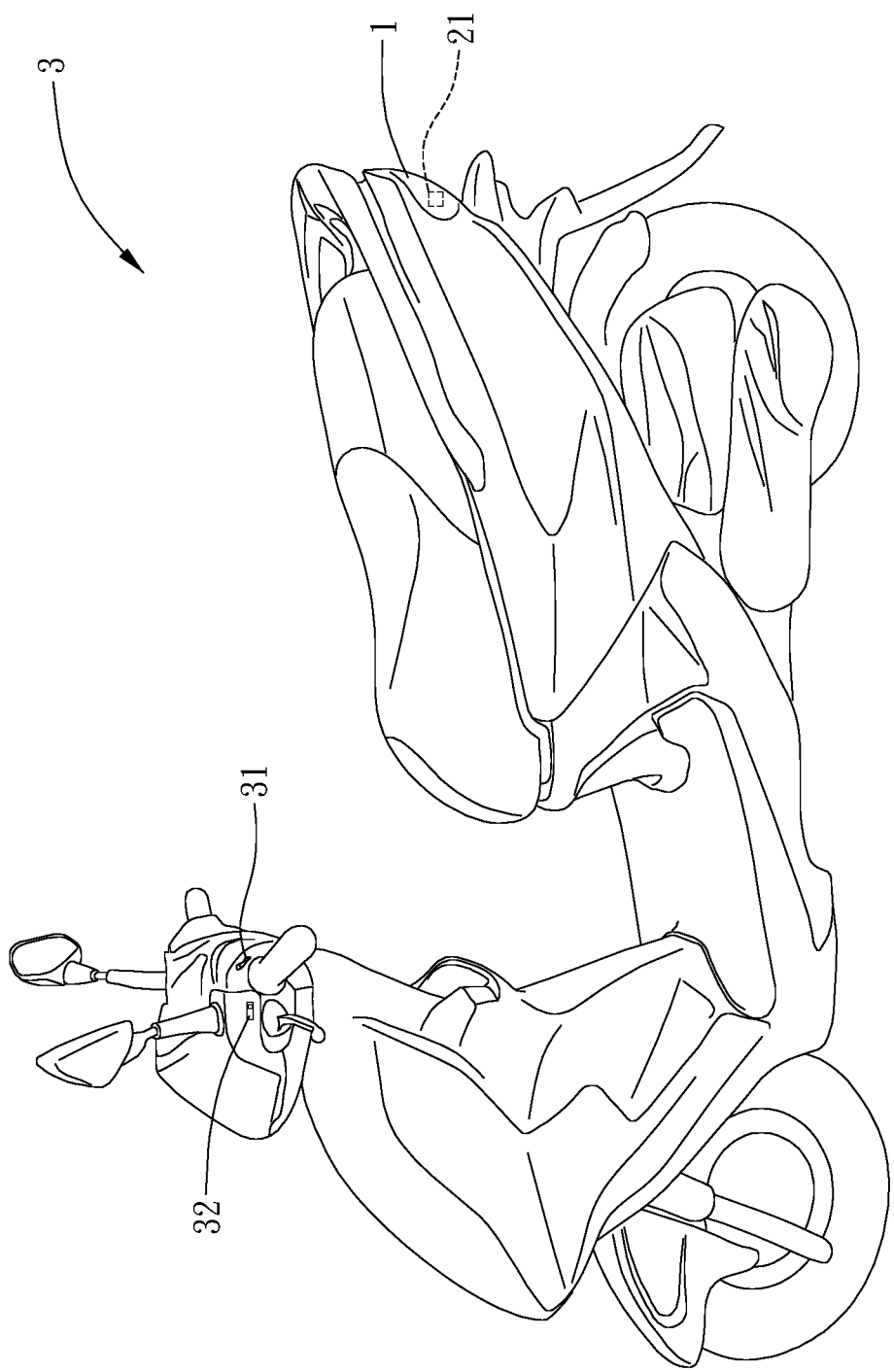
FIG. 1 is a stereogram of a preferable embodiment of the present invention.
Figure 2:
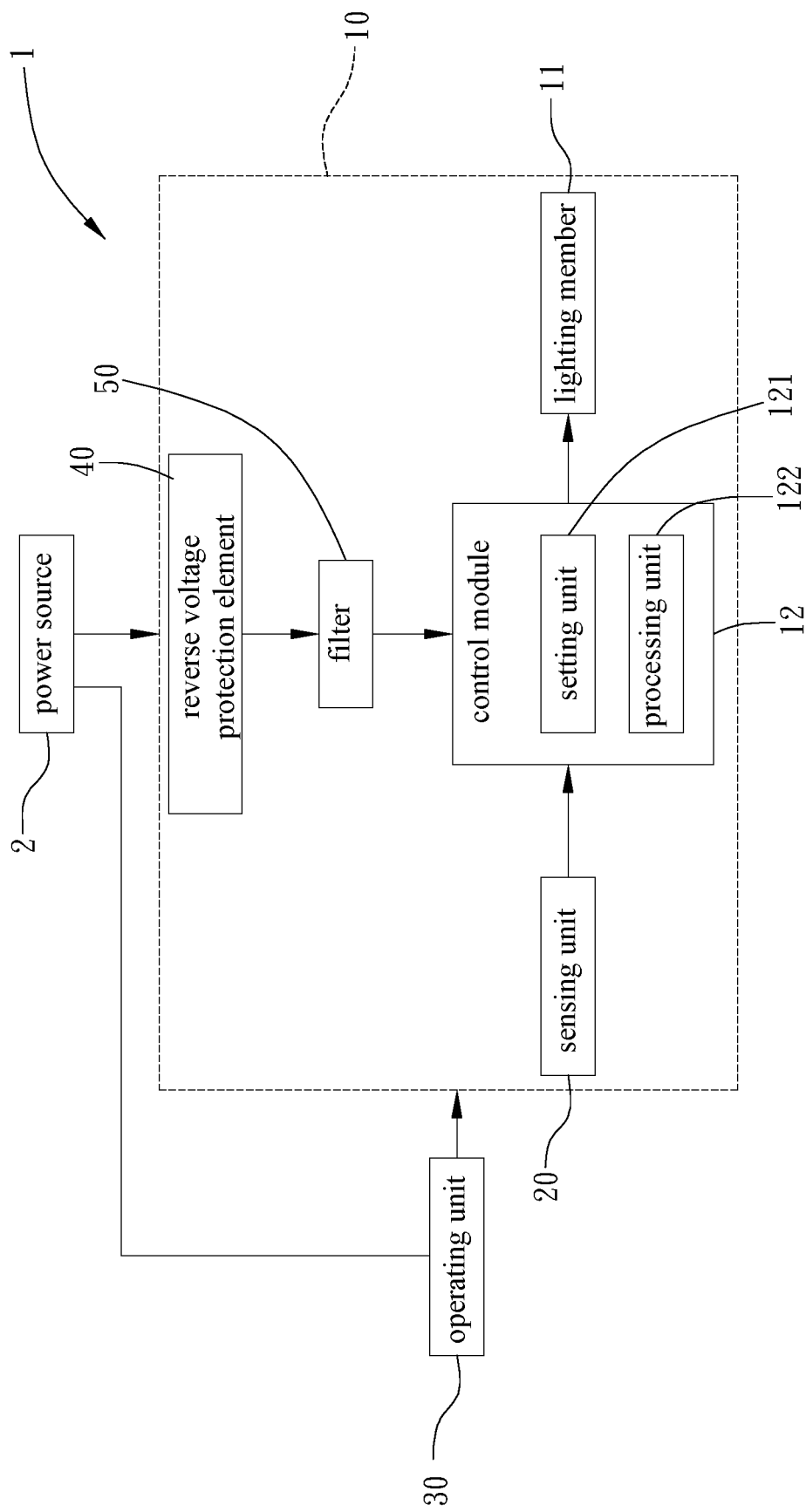
FIG. 2 is a block diagram showing a configuration of a preferable embodiment of the present invention.

Please refer to FIGS. 1 to 2 for a preferable embodiment of the present invention. A control assembly 1 for a vehicle position lamp of the present invention includes a lighting device 10 and a sensing unit 20.

The lighting device 10 is configured to be connected with a power source 2 and includes at least one lighting member 11 and a control module 12 connected with the at least one lighting member 11. The sensing unit 20 is connected with the control module 12 and is configured to sense an external environment and generate a sensing signal. The control module 12 receives the sensing signal and adjusts a brightness of the at least one lighting member 11 accordingly so that the control assembly 1 for a vehicle position lamp can change the brightness of the at least one lighting member 11 according to the external environment so as to effectively warn.

Figure 3:
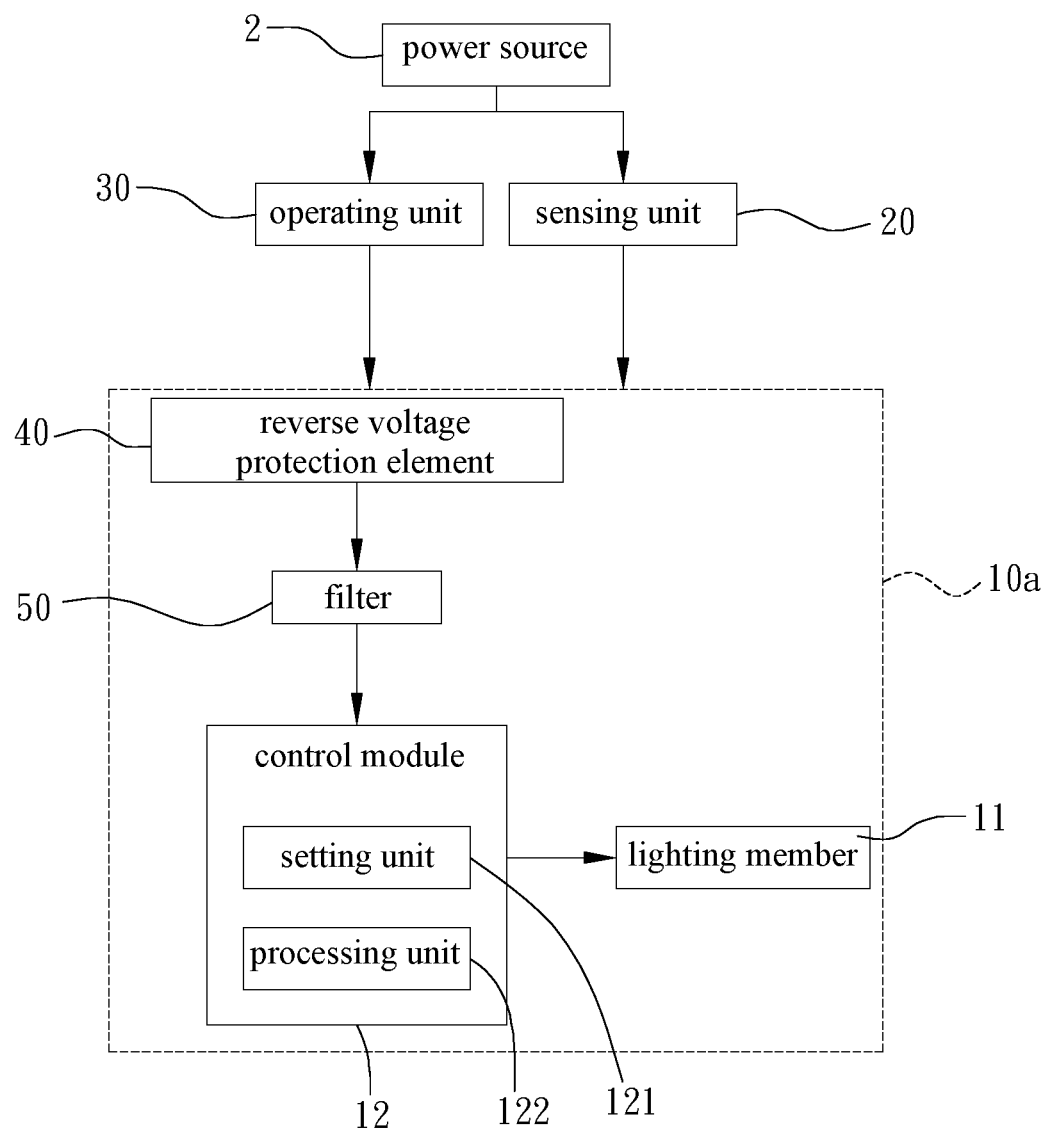
FIG. 3 is a block diagram showing a configuration of another preferable embodiment of the present invention.

The power source 2 may be a vehicle power source or an external power source. The sensing unit 20 includes a light sensor 21, and the light sensor 21 may be a photoresistor, a photodiode or a photoelectric transistor so as to sense a brightness of the external environment and generate the sensing signal. In this embodiment, the light sensor 21 is a photoresistor, which is low cost and is easy to be arranged; the at least one lighting member 11 is configured to be disposed on a rear of a vehicle 3, and the vehicle 3 may be a motorcycle, a car, an electric vehicle, a bicycle, or the like. The sensing unit 20 is disposed in the lighting device 10 so that the control assembly 1 for a vehicle position lamp is modularized and is convenient to be assembled. When the photoresistor senses that the external environment is dim, a resistance value generated by the photoresistor (i.e. the sensing signal) is larger; when the photoresistor senses that the external environment is bright, the resistance value generated by the photoresistor is smaller. The control module 12 changes a strength of an electrical signal transmitted to the at least one lighting member 11 after receiving the sensing signal, and then controls the brightness of the at least one lighting member 11 for easy recognition. In other embodiment, the at least one lighting member may be disposed on a front of the vehicle to meet different requirements; the sensing unit 20 may be disposed out of the lighting device 10a, as shown in FIG. 3, which is convenient to replace and repair.

Specifically, the control module 12 further includes a setting unit 121 and a processing unit 122 communicated with each other, the setting unit 121 is configured to set a plurality of brightness levels and a plurality of ranges of sensing signal, and each of the plurality of ranges of sensing signal corresponds to one of the plurality of brightness levels. When the sensing signal is in one said ranges of sensing signal, the processing unit 122 controls the brightness of the at least one lighting member 11 to one of the plurality of brightness levels corresponding to the said range of sensing signal so as to adjust the brightness of the at least one lighting member 11 to different brightness levels. For example, the plurality of ranges of sensing signal are respectively defined as ranges from 2~8 ohms, 9~15 ohms and 16~22 ohms, and each of the ranges of sensing signal respectively correspond to a first, a second and a third brightness levels. When the sensing signal is 6 ohms, the processing unit 122 controls the electrical signal transmitted to the at least one lighting member 11 to adjust the brightness of the at least one lighting member 11 to the first brightness levels. In other embodiments, the setting unit may be set so that the processing unit can gradually adjust the brightness of the at least one lighting member according to the sensing signal.

In other embodiments, the sensing unit may further include a distance sensor, such as an infrared sensor, a laser sensor or an ultrasonic sensor, and the setting unit may be configured to set a predetermined distance. When the sensing unit senses that a distance (i.e. the sensing signal) between the rear of the vehicle and a vehicle behind and the processing unit determines that the distance is smaller than the predetermined distance, the processing unit controls the at least one lighting member to change its operation state so as to achieve warning effect and improve driving safety. The change of operation state of the at least one lighting member may include increasing luminous intensity, turning on, flashing, changing light color, etc.

In this embodiment, at least one of the at least one lighting member 11 is a bilux bulb and includes two light emitting sources. One of the two light emitting sources is electrically connected with the control module 12, and the other of the two light emitting sources is electrically connected with a brake light control system of the vehicle 3, which is easy to arrange and facilitates miniaturization. The bilux bulb may be a tungsten light bulb or a LED light bulb, which is selectable according to requirements.

Preferably, the control assembly 1 for the vehicle position lamp further includes an operating unit 30 connected with the lighting device 10, and the operating unit 30 is configured to be operated and generates a control signal. The control module 12 receives the control signal and changes an operation state of the at least one lighting member 11 accordingly. For example, the operating unit 30 may be used to turn on/off the at least one lighting member or adjust the brightness of the at least one lighting member 11. The operating unit 30 is configured to be disposed on the vehicle 3 and close to a handlebar assembly or a steering assembly of the vehicle 3, and the operating unit 30 includes at least one of a knob, a toggle switch 31, at least one button and an operation display interface for easy operation. When the control module 12 receives the sensing signal and the control signal at the same time, the processing unit 122 controls the at least one lighting member 11 according to the control signal. The operating unit 30 may further include a switch 32 configured to selectively interrupt a communication between the operating unit 30 and the control module 12 so that a user can select to adjust the at least one lighting member 11 according to the sensing signal or the control signal. In other embodiments, the operating unit may be a switch disposed between the power source and the lighting device which can selectively interrupt an electrical connection between the power source and the lighting device.

The control assembly 1 for the vehicle position lamp further includes a reverse voltage protection element 40 electrically connected with the control module 12, which prevents the control assembly 1 for the vehicle position lamp from being damaged due to wrong installation. The control assembly 1 for the vehicle position lamp further preferably includes a filter 50 electrically connected between the control module 12 and the reverse voltage protection element 40. The filter 50 is an electromagnetic compatibility filter or an electromagnetic interference filter so as to reduce electromagnetic interferences when the electrical signals are transmitted between the control assembly 1 for the vehicle position lamp and the power source 2.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A control assembly for a vehicle position lamp, including:
   a lighting device, configured to be connected with a power source, including at least one lighting member and a control module connected with the at least one lighting member; and
   a sensing unit, connected with the control module and configured to sense an external environment and generate a sensing signal;
   wherein the control module receives the sensing signal and adjusts a brightness of the at least one lighting member accordingly when the at least one lighting member is illuminated;
   wherein the sensing unit includes a light sensor, and the light sensor is a photoresistor, a photodiode or a photoelectric transistor;
   wherein at least one of the at least one lighting member includes two light emitting sources, one of the two light emitting sources is electrically connected with the control module, and the other of the two light emitting sources is electrically connected with a brake light control system of a vehicle; the at least one lighting member is configured to be disposed on a rear of the vehicle;
   wherein the control assembly for the vehicle position lamp further includes an operating unit connected with the lighting device, the operating unit is configured to be operated and generates a control signal, and the control module receives the control signal and changes an operation state of the at least one lighting member accordingly; when the control module receives the sensing signal and the control signal at the same time, the control module controls the at least one lighting member according to the control signal.

2. The control assembly for the vehicle position lamp of claim 1, wherein the control module further includes a setting unit and a processing unit communicated with each other, the setting unit is configured to set a plurality of brightness levels and a plurality of ranges of sensing signal, each of the plurality of ranges of sensing signal corresponds to one of the plurality of brightness levels; and when the sensing signal is in one said range of sensing signal, the processing unit controls the brightness of the at least one lighting member to one of the plurality of brightness levels corresponding to the said range of sensing signal.

3. The control assembly for the vehicle position lamp of claim 1, further including a reverse voltage protection element electrically connected with the control module.

4. The control assembly for the vehicle position lamp of claim 3, further including a filter electrically connected between the control module and the reverse voltage protection element, wherein the filter is an electromagnetic compatibility filter or an electromagnetic interference filter.

5. The control assembly for the vehicle position lamp of claim 1, wherein the operating unit is configured to be disposed on a vehicle and close to a handlebar assembly or a steering assembly of the vehicle, and the operating unit includes at least one of a knob, a toggle switch, at least one button and an operation display interface.

6. The control assembly for the vehicle position lamp of claim 4, wherein the light sensor is a photoresistor; the control module further includes a setting unit and a processing unit, the setting unit is configured to set a plurality of brightness levels and a plurality of ranges of sensing signal, each of the plurality of ranges of sensing signal corresponds to one of the plurality of brightness levels; when the sensing signal is in one said range of sensing signal, the processing unit controls the brightness of the at least one lighting member to one of the plurality of brightness levels corresponding to the said range of sensing signal; at least one of the at least one lighting member is a bilux bulb; the operating unit is configured to be disposed on the vehicle and close to a handlebar assembly or a steering assembly of the vehicle, and the operating unit includes at least one of a knob, a toggle switch, at least one button and an operation display interface; and the operating unit further includes a switch configured to selectively interrupt a communication between the operating unit and the lighting device.

* * * * *